(12) United States Patent
Choi et al.

(10) Patent No.: US 9,940,012 B2
(45) Date of Patent: Apr. 10, 2018

(54) DISPLAY DEVICE, CALIBRATION DEVICE AND CONTROL METHOD THEREOF

(71) Applicant: SAMSUNG ELECTRONICS CO., LTD., Suwon-si (KR)

(72) Inventors: Kil-soo Choi, Yongin-si (KR); Young-il Kim, Seongnam-si (KR); Jung-rae Kim, Suwonsi (KR); Jong-min Baek, Seoul (KR); Jae-soon Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 780 days.

(21) Appl. No.: 14/459,921

(22) Filed: Aug. 14, 2014

(65) Prior Publication Data
US 2015/0193113 A1  Jul. 9, 2015

(30) Foreign Application Priority Data

Jan. 7, 2014  (KR) .................. 10-2014-0001745

(51) Int. Cl.
*G06F 3/048* (2013.01)
*G06F 3/0488* (2013.01)
(Continued)

(52) U.S. Cl.
CPC ............ *G06F 3/0488* (2013.01); *G06F 3/017* (2013.01); *G06F 3/0346* (2013.01); *G06F 3/0386* (2013.01); *G06F 3/04812* (2013.01); *G06F 3/04883* (2013.01); *G08C 17/00* (2013.01); *H04N 5/4403* (2013.01); *H04N 21/422* (2013.01); *H04N 21/4312* (2013.01);
(Continued)

(58) Field of Classification Search
CPC ....... G06F 3/04883; G06F 2203/04806; G06F 3/0481; G06F 3/017; G06F 3/167; G06F 2203/04803; G06F 3/04812; G06F 3/0488; G06T 2219/2021
See application file for complete search history.

(56) References Cited

U.S. PATENT DOCUMENTS

| | | |
|---|---|---|
| 9,594,504 B2 * | 3/2017 | Williams ............ G06F 3/04883 |
| 2006/0010400 A1 * | 1/2006 | Dehlin .................. G06F 3/0354 715/856 |
| 2007/0124694 A1 | 5/2007 | Van De Sluis et al. |
| 2007/0180400 A1 | 8/2007 | Zotov et al. |

(Continued)

FOREIGN PATENT DOCUMENTS

| | | |
|---|---|---|
| EP | 1615109 A2 | 1/2006 |
| KR | 10-2011-0010906 A | 2/2011 |

OTHER PUBLICATIONS

Communication dated Jul. 4, 2016, issued by the European Patent Office in counterpart European Application No. 14196837.0.
(Continued)

*Primary Examiner* — Linh K Pham
(74) *Attorney, Agent, or Firm* — Sughrue Mion, PLLC

(57) ABSTRACT

A display device for displaying an application in an execution area according to a user input is disclosed. The display device includes a user interface configured to receive a user input corresponding to a shape, a display, and a controller configured to determine an application corresponding to the shape and determine an execution area for the application on a screen of the display in response to the user interface receiving the user input, and control the display of the application in the execution area.

16 Claims, 9 Drawing Sheets

(51) Int. Cl.

| | |
|---|---|
| *G06F 3/01* | (2006.01) |
| *G06F 3/038* | (2013.01) |
| *G08C 17/00* | (2006.01) |
| *H04N 5/44* | (2011.01) |
| *H04N 21/431* | (2011.01) |
| *G06F 3/0346* | (2013.01) |
| *G06F 3/0481* | (2013.01) |
| *H04N 21/422* | (2011.01) |
| *H04N 21/442* | (2011.01) |
| *H04N 21/443* | (2011.01) |
| *H04N 21/4223* | (2011.01) |

(52) U.S. Cl.
CPC ... *H04N 21/4438* (2013.01); *H04N 21/44218* (2013.01); *G06F 2203/04803* (2013.01); *G08C 2201/32* (2013.01); *H04N 21/4223* (2013.01)

(56) References Cited

U.S. PATENT DOCUMENTS

| | | | |
|---|---|---|---|
| 2010/0257447 A1 | 10/2010 | Kim et al. | |
| 2011/0074703 A1* | 3/2011 | Black | G06F 3/0426 |
| | | | 345/173 |
| 2011/0164029 A1* | 7/2011 | King | G06F 3/04883 |
| | | | 345/419 |
| 2011/0296329 A1 | 12/2011 | Tanaka | |
| 2012/0218196 A1* | 8/2012 | Lv | G06F 3/0416 |
| | | | 345/173 |
| 2013/0097556 A1* | 4/2013 | Louch | G06F 3/0488 |
| | | | 715/790 |
| 2013/0263042 A1 | 10/2013 | Buening | |

OTHER PUBLICATIONS

Communication dated May 8, 2015 by the European Patent Office in related Application No. 14196837.0.

* cited by examiner

US 9,940,012 B2

DISPLAY DEVICE, CALIBRATION DEVICE AND CONTROL METHOD THEREOF

CROSS-REFERENCE TO RELATED APPLICATION

This application claims priority from Korean Patent Application No. 10-2014-0001745 filed on Jan. 7, 2014 in the Korean Intellectual Property Office, the disclosure of which is incorporated herein by reference in its entirety.

BACKGROUND

Field

Apparatuses and methods consistent with exemplary embodiments relate to a display device, a calibration device and a control method thereof, and more particularly, to a display device, a calibration device and a control method thereof configured to determine an application with respect to a shape of a user input, determine an execution area of the application in a display corresponding to a location of the shape of the user input and display an image of the determined application in the determined execution area.

Description of the Related Art

When providing features that attempt to ensure a user's convenience, a display device may provide a function that executes a predetermined application with respect to a user's particular gesture.

A display device may execute an application or perform a particular operation with respect to a predetermined user input. The display device may execute an application or perform a particular operation with respect to a predetermined user input. However the display device does not execute an application by dividing a screen, nor does the display device execute an application in a particular location when performing a particular operation. If an application is executed across a screen, a user may not view content such as an image that the user was viewing, and rather will inconveniently adjust the size of the application or terminate the application in order to return to the content.

SUMMARY

Accordingly, one or more exemplary embodiments provide a display device, a calibration device and a control method thereof configured to execute an application in a selected size and in a selected location through a particular user input.

According to an aspect of an exemplary embodiment, there is provided a display device including a user interface configured to receive a user input corresponding to a shape, a display, and a controller configured to determine an application corresponding to the shape and determine an execution area for the application on a screen of the display in response to the user interface receiving the user input, and control the display of the application in the execution area.

The user input may include an input by at least one of a pointing device and a gesture.

The controller may be further configured to control the user interface, and wherein the user interface is further configured to receive a touch input on the screen from the user using a pointer.

The display device may further include a memory configured to store the application and the execution area of the application in association with the shape, wherein the controller is further configured to determine whether the shape of the received user input matches the stored shape corresponding to the application stored in the memory.

The controller may further configured to control the display to display a UI of the application in a size on the display based on the shape of the user input.

The controller may be further configured to identify a starting location and an ending location of the user input, and the execution area of the application is based on the starting location and the ending location.

The controller may be further configured to determine the execution area of the application according to a direction of the user input.

According to an aspect of another exemplary embodiment, there is provided a method for controlling a display device, the method including receiving a user input corresponding to a shape, determining an application corresponding to the shape, determining an execution area for the application on a screen of the display in response to the user interface receiving the user input, and displaying the application in the execution area.

The user input may include an input by at least one of a pointing device and a gesture.

The receiving may further include receiving a touch input on the screen from the user using a pointer.

The determining the application may include determining whether the shape of the received user input matches a stored shape corresponding to the application.

The displaying may include generating a UI of the application in a size based on the shape of the user input.

The determining the execution area may include identifying a starting location and an ending location of the user input, and determining the execution area of the application further based on the starting location and the ending location.

The determining the execution area may include determining the execution area of the application according to a direction of the user input.

According to an aspect of another exemplary embodiment, there is provided a display device including a display, a user interface configured to receive a user input at a location relative to the display device, a controller configured to select an application based on shape of the user input, and configured to determine an execution area on the display in which the application is to be displayed based on the location.

The controller may be further configured to determine another area of the display on which to display a second application from the execution area.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Figure 1:
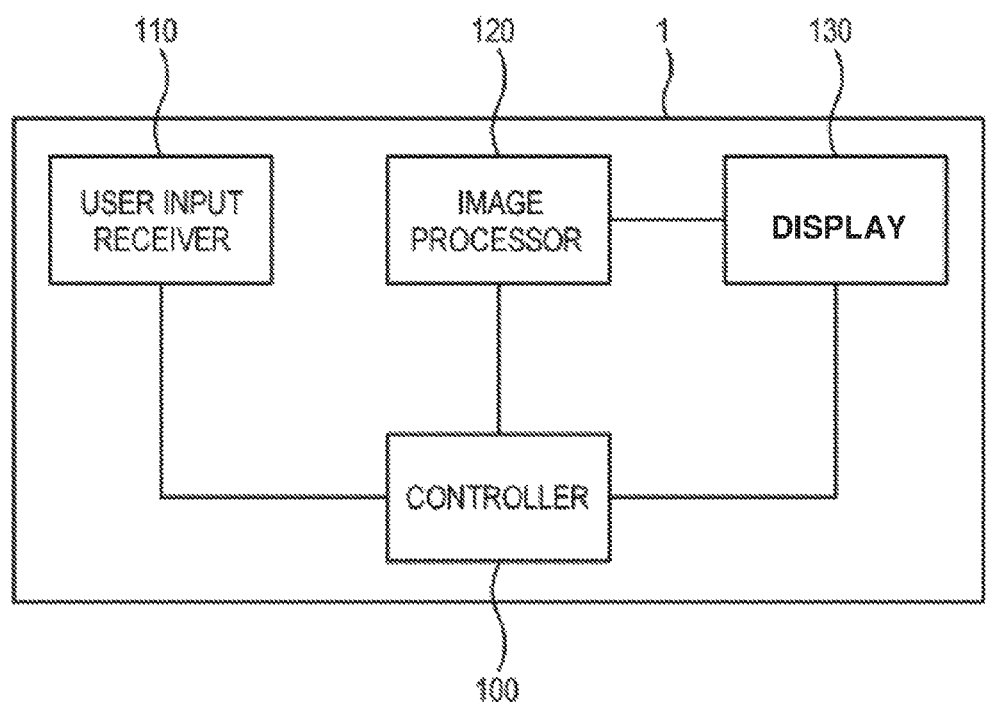
FIG. 1 is a block diagram of a display device according to an exemplary embodiment.

Below, exemplary embodiments will be described in detail with reference to accompanying drawings so as to be easily realized by a person having ordinary knowledge in the art. The exemplary embodiments may be embodied in various shapes without being limited to the exemplary embodiments set forth herein. Descriptions of well-known parts are omitted for clarity, and like reference numerals refer to like elements throughout.

According to one or more exemplary embodiments, there is provided a method and/or apparatus for executing a selected application in a selected location of the display device even when a user is viewing content such as an image, to enable a user to more conveniently use the display device.

Figure 5:
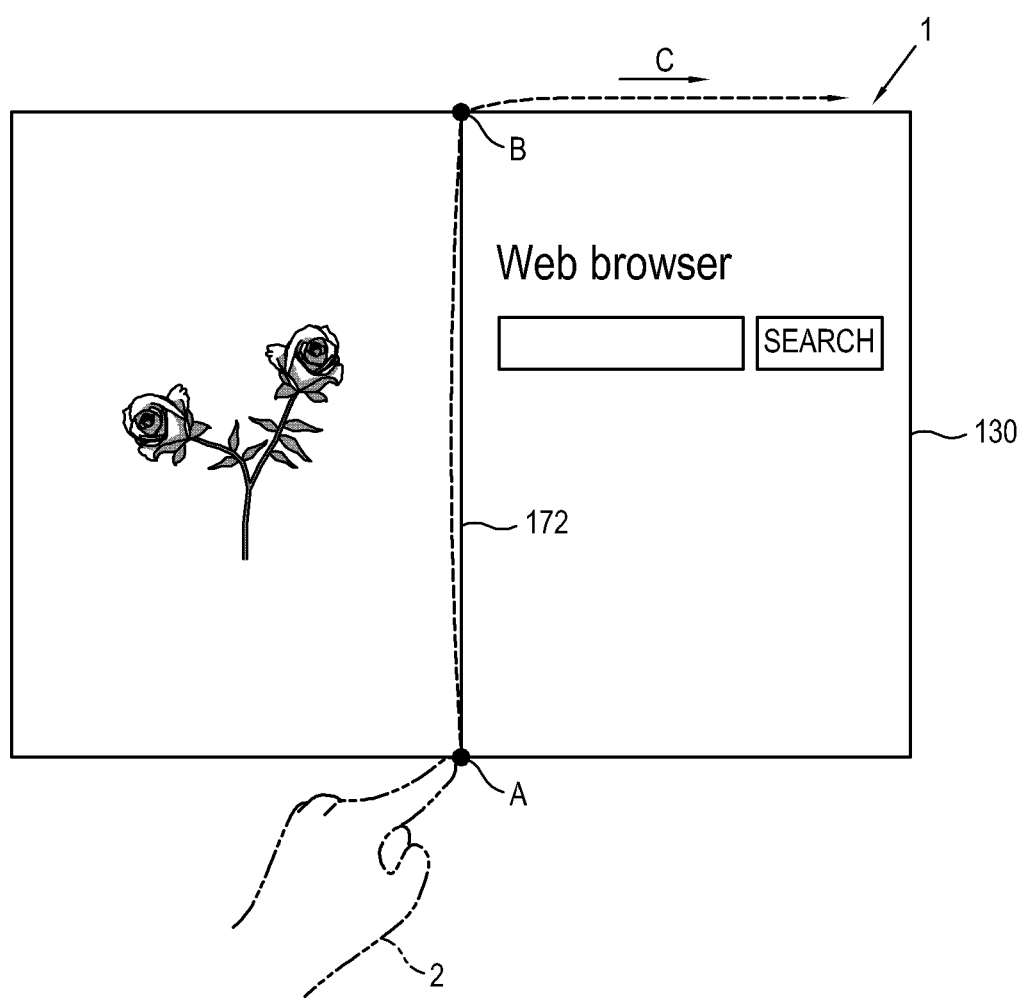
FIGS. 5 to 9 illustrate examples of operations of display devices according to one or more exemplary embodiments.

If a gesture is input as an example of a user input, a display device 1 (as shown in FIG. 1) according to an exemplary embodiment recognizes the gesture of a user 2 (as shown in FIG. 5) and determines which of applications 172 to 179 (as shown in FIGS. 5-9) will be executed. The display device 1 determines an execution area of the applications 172 to 179 by determining a portion of the display device 1 to which the gesture of the user 2 has been input, based on a center of the display device 1. For example, if a gesture has been input from a left top portion of the display device 1, the display device 1 may divide a screen transversely or vertically and display an image of the applications 172 to 179 such as a web browser in the divided screens. The display device 1 according to the exemplary embodiment may be implemented as any device such as a smart television (TV), a laptop computer, a tablet PC or a user terminal that may display an image therein.

FIG. 1 is a block diagram of the display device 1 according to an exemplary embodiment. The display device 1 according to the exemplary embodiment may include a user input receiver 110 (which may also be called a user interface), an image processor 120, a display 130 and a controller 100.

The user input receiver 110, or user interface, may transmit preset various control commands or information to the controller 100 according to a user's manipulation and input. The user input receiver 110 may be implemented as a menu key or an input panel that is installed in an external side of the display device 1, or as a remote controller that is separated/spaced from the display device 1. Alternatively, the user input receiver 110 may be integrally formed in the display 130. If the display 130 is a touch screen, the user 2 may touch an input menu displayed on the display 130, and a preset command may be transmitted to the controller 100.

The user input receiver 110 may receive user's motion and voice. A user's motion may include a touch input, a movement of the device or an external device received by a piezoelectric sensor, and a visual gesture received by a camera sensor. The user input receiver 110 may directly receive user's motion and voice, or receive information of user's motion and voice from an external device.

The type of the image processing operation performed by the image processor 120 may include, without limitation, de-multiplexing for dividing a predetermined signal into signals by nature; decoding corresponding to an image format of image signals; de-interlacing for converting interlace image signals into progressive image signals; noise reduction for improving image quality; detail enhancement; frame refresh rate conversion, etc. The image processor 120 may include a decoder to decode a source image corresponding to an image format of an encoded source image, and a frame buffer to store a decoded source image by frame.

The image processor 120 may be implemented as a system-on-chip (SOC) which integrally performs the foregoing functions, or as an image processing board that is formed by installing individual elements in a printed circuit board (PCB) and that is installed in the display device 1 to perform the foregoing functions independently.

The image processor 120 processes a broadcasting signal including an image signal that is received by an image receiver and a source image including an image signal supplied by an image supply source according to preset various image processing operations. The image processor 120 may output the processed image signal to the display device 1 to display the processed source image in the display device 1.

The display 130 may display an image thereon based on an image signal that is output by the image processor 120. The display 130 may be implemented as various displays including, without limitation, liquid crystal, plasma, light-emitting diode, organic light-emitting diode, surface-conduction electron-emitter, carbon nano-tube, and nano-crystal.

The display 130 may further include additional elements depending on its exemplary embodiment type. For example, the display 130 as a liquid crystal display, may include a liquid crystal display (LCD) panel, a backlight unit emitting light to the LCD panel and a panel driving substrate driving the LCD panel.

The display 130 displays an image thereon based on an image signal processed by the image processor 120. The display 130 employs LCD, plasma display panel (PDP), organic light-emitting diode (OLED), etc. to display an image thereon. In this case, the display 130 may include an LCD panel, a PDP panel or an OLED panel.

The display 130 may display an image and a color correction process thereon. The display 130 may include a display panel to display an image thereon and a panel driver to process an input image signal to display an image on the display panel based on the processed image signal, but not limited thereto. An image signal that is provided by an external input source through an interface may be decoded, de-interlaced, and scaled to be displayed by the display 130. If the controller 100 performs color correction according to a user's command, the display 130 may display a color correction process thereon including a color patch and a color correction status window.

If a user input is received, the controller 100 may determine applications 172 to 179 corresponding to a shape of the user input and an execution area of the applications 172 to 179 in a screen of the display 130, and display an image of the applications 172 to 179 in the determined execution area.

Figure 2:
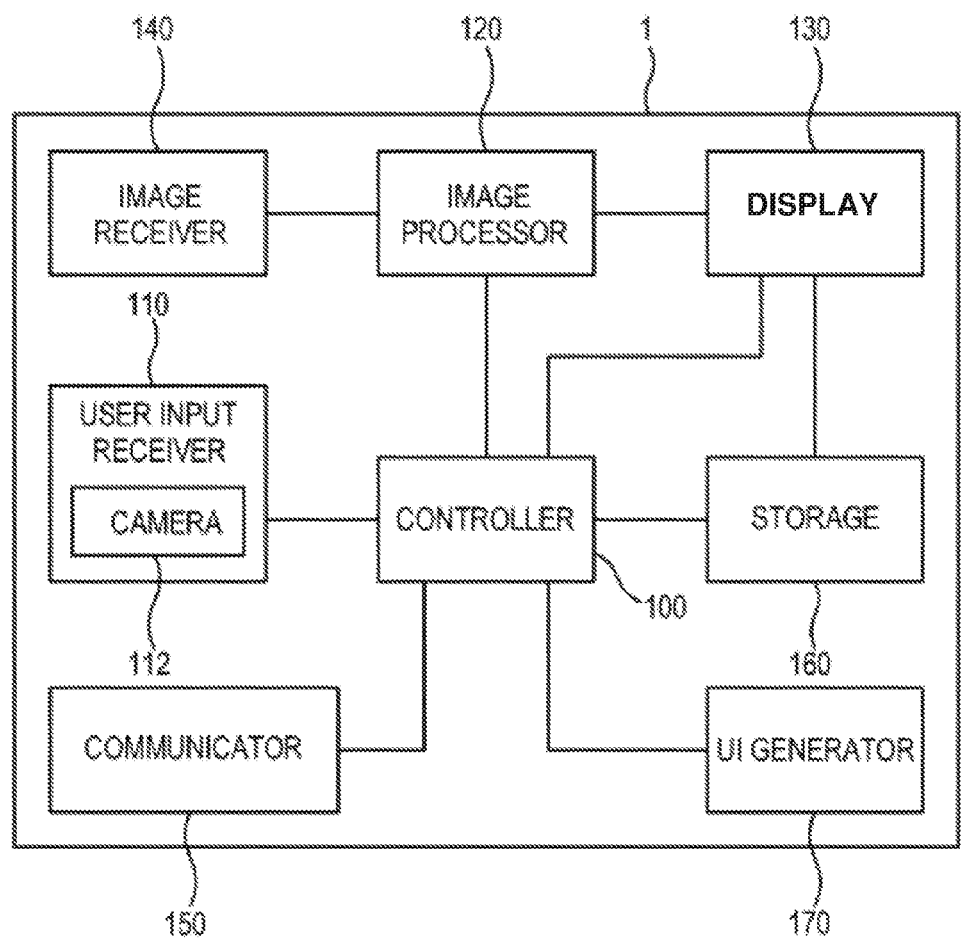
FIG. 2 is a block diagram of a display device according to another exemplary embodiment.

FIG. 2 is a block diagram of a display device 1 according to another exemplary embodiment. The display device according to the another exemplary embodiment may include the elements shown in FIG. 1, and may further include an image receiver 140, a communicator 150, a storage 160 (which may also be called a memory) and a user interface (UI) generator 170.

The user input receiver 110 may include a camera 112 that may capture and receive a gesture of the user 2. The user input receiver 110 may include a motion sensor such as a vibration gyro sensor and/or a piezoelectric sensor.

The image receiver 140 may receive image signals/image data in a wired/wireless manner and transmit the image signals/image data to the image processor 110. The image receiver 140 may receive broadcasting signals as image signals from a broadcasting signal transmission device, receive image signals from imaging devices such as a digital versatile disc (DVD) player or a blue-ray disc (BD) player, receive image signals from a personal computer (PC), receive image signals from a mobile device such as a smart phone or a smart pad, receive image signals through a network such as the Internet or receive image content as image signals stored in a storage/memory medium such as a universal serial bus (USB) stick. In another exemplary embodiment, image signals may be stored in advance in the storage 160 rather than received through the image receiver 140. The image receiver 140 may be provided in various manners corresponding to a standard of a received image signal and an exemplary embodiment type of the display device 1. For example, the image receiver 140 may receive a radio frequency (RF) signal, or receive image signals according to standards such as composite video, component video, super video, SCART, high definition multimedia interface (HDMI), DisplayPort, unified display interface (UDI), or wireless HD. If an image signal is a broadcasting signal, the image receiver 140 may include a tuner to tune the broadcasting signal by channel.

The communicator 150 may receive a signal from an external input and transmit the signal to the image processor 120 or the controller 100. The communicator 150 may receive a signal from an external input through various external input cables in a wired manner, and may receive a wireless signal according to a predetermined wireless communication standard.

The communicator 150 may include a plurality of connectors to which respective cables are individually connected. The communicator 150 may receive signals from a connected external input, e.g., receive broadcasting signals, image signals and data signals according to standards such as HDMI, USB or component, or receive communication data through a communication network.

The communicator 150 may further include various additional elements such as a wireless communication module for wireless communication or a tuner to tune a broadcasting signal depending on a design type of the display device 1 as well as elements to receive signals/data from an external input. The communicator 150 may transmit information/data/signals of the display device 1 to an external device, as well as receiving signals from an external device. That is, the communicator 150 may not be limited to the element for receiving signals from an external input, and may also be implemented as an interface for interactive communication. The communicator 150 may receive a control signal from a plurality of control devices to select a user interface (UI). The communicator 150 may be implemented as a communication module for known near field communication such as Bluetooth, infrared (IR), ultra wideband (UWB) or Zigbee, or as a known communication port for wired communication. The communicator 150 may be used for various purposes such as transmission and reception of commands for manipulating displays, and transmission and reception of data as well as control signals for selecting a UI.

The storage/memory 150 may include a writable ROM in which data remain even upon cutoff of power to the display device 1, and in which any change may be reflected in respect of a user. That is, the storage 150 may be implemented as one of a flash memory, an erasable programmable read only memory (EPROM) and an electrically erasable programmable read only memory (EEPROM). The storage 150 may store therein the applications 172 to 179 and an execution area of the applications 172 to 179 in a screen of the display 130 corresponding to a user input.

The UI generator 170 may generate a UI for executing an application program. The generated UI may include a plurality of sub UIs that are provided in the form of icons and texts. If the user 2 selects a particular sub UI through the display device 1, an application program may be executed corresponding to the selected sub UI. That is, the respective sub UIs may be generated for a plurality of functions or events for executing the application program in the display device 1.

The UI generator 170 may be one or a combination of software and/or hardware functioning to generate and control a UI displayed on the display 130, and such function may be performed through the controller 100. That is, the UI generator 170 is not necessarily implemented as an additional chipset or an additional microprocessor.

A user input may include an input using a pointing device or by a gesture.

If a user input is set to correspond to a pointer, the controller 100 may terminate the setting if the user input is outside a screen area of the display 130. If the user 2 intends to input a particular motion with a pointer displayed on the display 130 by using a pointing device or a gesture to display the applications 172 to 179, and if the input by the pointing device or gesture is outside the screen area of the display 130, the pointer may stop moving or may move a little at an edge of the screen area of the display 130. An input by a pointing device or a gesture that is outside the screen area of the display 130 may not be received. Therefore, the user 2 may terminate the setting of the gesture with respect the pointer when giving his/her input by the pointing device or gesture when that input is outside the screen area of the display 130.

The controller 100 may determine whether a shape of a received user input is equal to a shape of a user input stored in the storage 160.

According to the determination result, the controller 100 may control the UI generator 170 to generate a UI for the applications 172 to 179 in a size corresponding to the shape of the user input on the display 130.

The controller 100 may identify starting and ending locations of the shape of the user input and determine an execution area of the applications 172 to 179. For example, the input using the pointing device or a gesture from the user 2 may start from a starting location in the screen area of the display 130, then may extend outside the screen area of the display 130, and then may return inside the screen area at what can be determined to be an ending position of the input from the pointing device or gesture that is within the screen area of the display 130. The location and size of the execution area of the applications 172 to 179 may be determined on the basis of the starting and ending locations of the shape of the input of the pointing device or gesture.

The controller 100 may determine an execution area of the applications 172 to 179 corresponding to a direction of a user input.

The direction of the input of the pointing device of gesture may be divided into four, eight, or more such as for example into 16 finely tuned directions. The controller 100 may identify a final input direction of an input of the pointing device or gesture to determine the location and size of the execution area of the applications 172 to 179.

Figure 3:
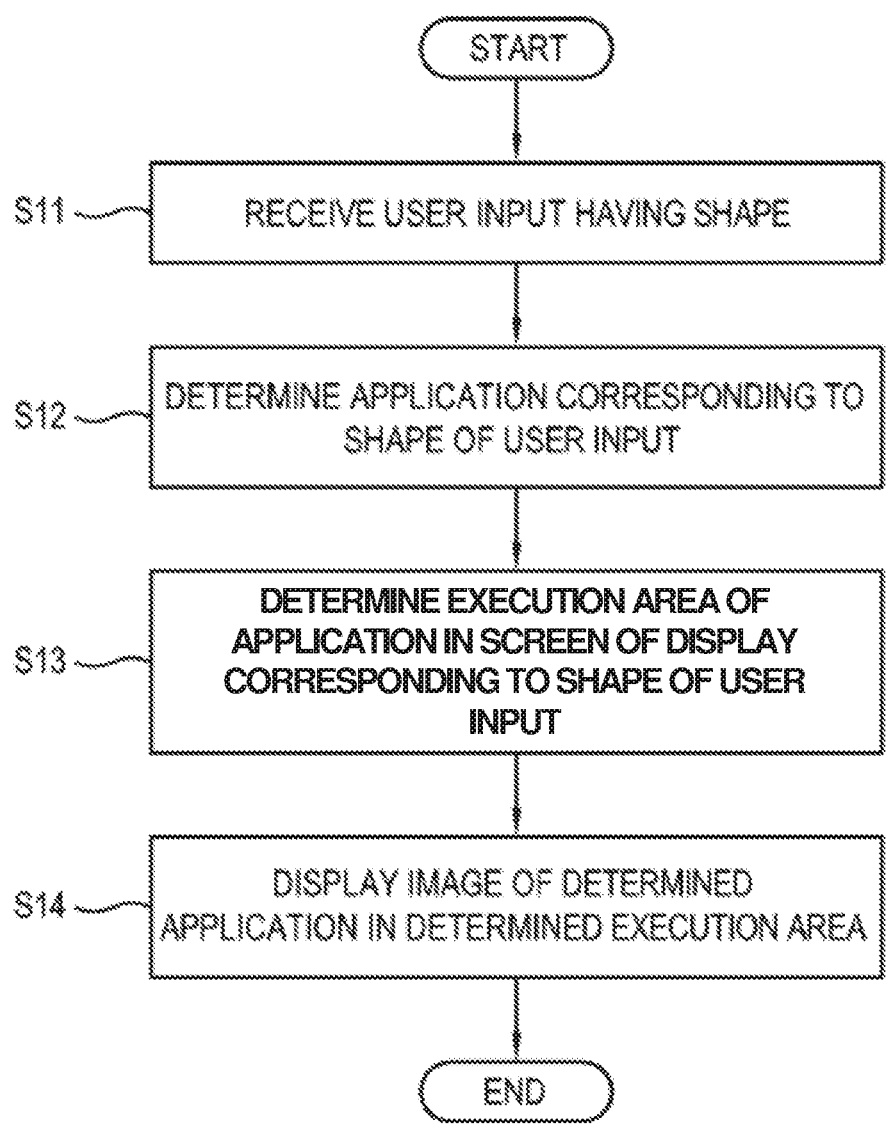
FIG. 3 is a control flowchart showing operations of the display device according to an exemplary embodiment.

FIG. 3 is a control flowchart showing operations of the display device 1 according to the exemplary embodiment.

A user input which has a shape is received (S11).

The applications 172 to 179 are determined corresponding to the shape of the use input (S12).

The execution area of the applications 172 to 179 in the screen of the display 130 is determined corresponding to the shape of the user input (S13).

The image of the determined applications 172 to 179 is displayed in the determined execution area (S14).

Figure 4:
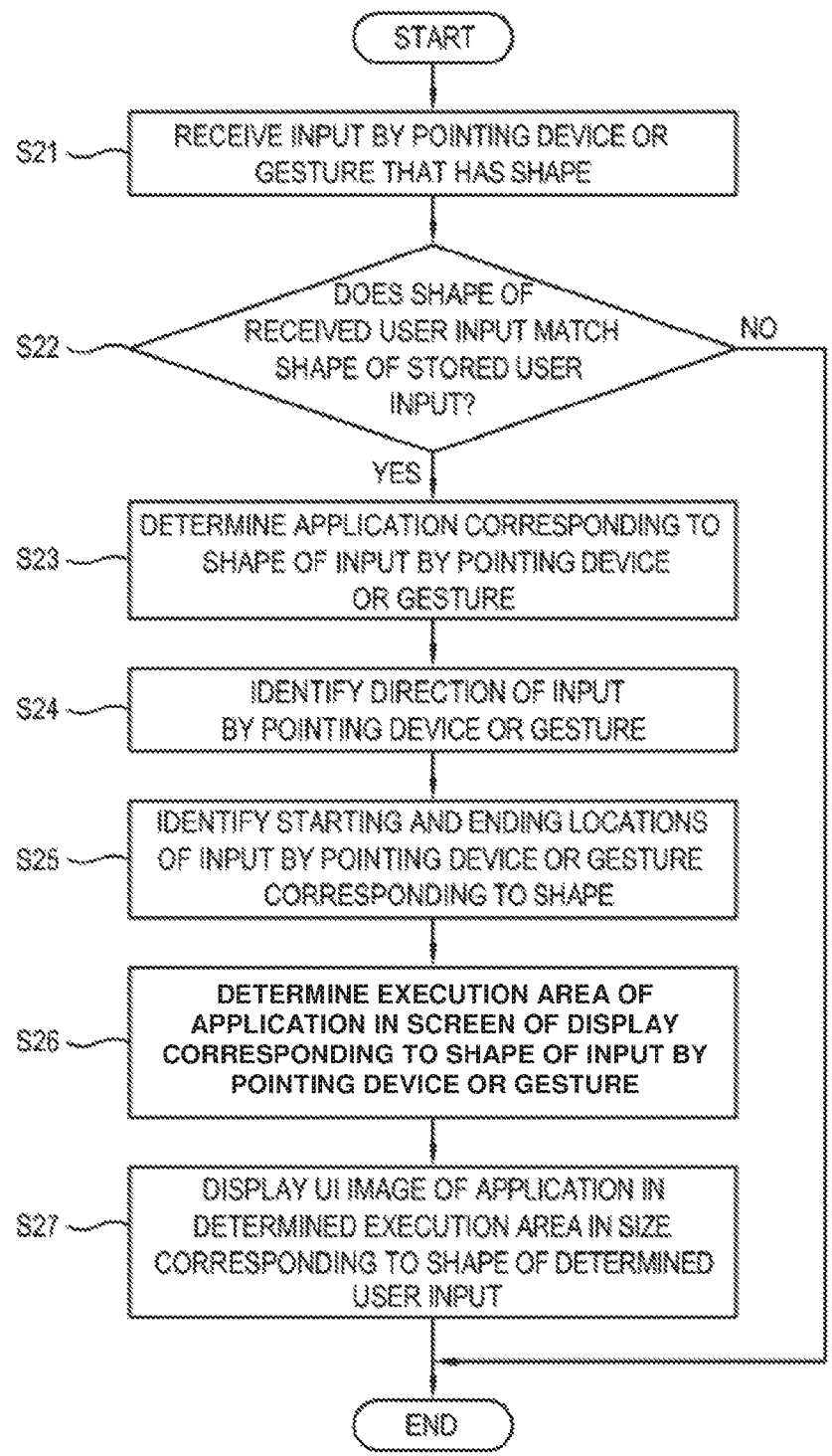
FIG. 4 is a control flowchart showing operations of the display device according to another exemplary embodiment.

FIG. 4 is a control flowchart showing operations of the display device 1 according to the another exemplary embodiment.

An input from the pointing device or a gesture that has a shape is received (S21).

It is determined whether the shape of the received user input matches the shape of the stored user input (S22).

If the shape of the received user input does not match the shape of the stored user input, the operations of the display device 1 may end.

The applications 172 to 179 are determined corresponding to the shape of the input of the pointing device or gesture (S23).

The direction of the input of the pointing device or gesture is identified (S24).

Based on an example of four directions or locations relative to the display apparatus/device, i.e. top/bottom/left and right locations/directions, if the direction of the input of the pointing device or gesture is toward the right side, the applications 172 to 179 may be displayed in the right side. Said another way, if the input is provided in a location to the right of the display, one of the applications 172 to 179 may be displayed on the right side of the display.

The starting and ending locations of the shape of the input of the pointing device or gesture are determined (S25).

The execution area of the applications 172 to 179 in the screen of the display 130 is determined corresponding to the shape of the input of the pointing device or gesture (S26).

The UI image of the applications 172 to 179, in a size corresponding to the determined shape of the user input, is displayed in the determined execution area (S27).

FIG. 5 illustrates an example of operations performed by a display device 1 according to another exemplary embodiment.

FIG. 5 illustrates a gesture by the user 2 that is made by his/her hand and moves on a screen from area A to B of the display 130, i.e. from bottom to top, and then moves in a C direction that is outside the screen area of the display 130.

A flower image was displayed on the display 130 prior to the gesture of the user 2, and after the gesture of the user 2, a web browser 172 is displayed in a right side of the display 130. The flower image, which was displayed before the gesture of the user 2 was made, is now displayed in a left side of the display 130. The gesture of the user 2 made in the C direction is received by the camera 112 of the user input receiver 110 regardless of whether the gesture is within or outside the screen area of the display 130.

Figure 6:
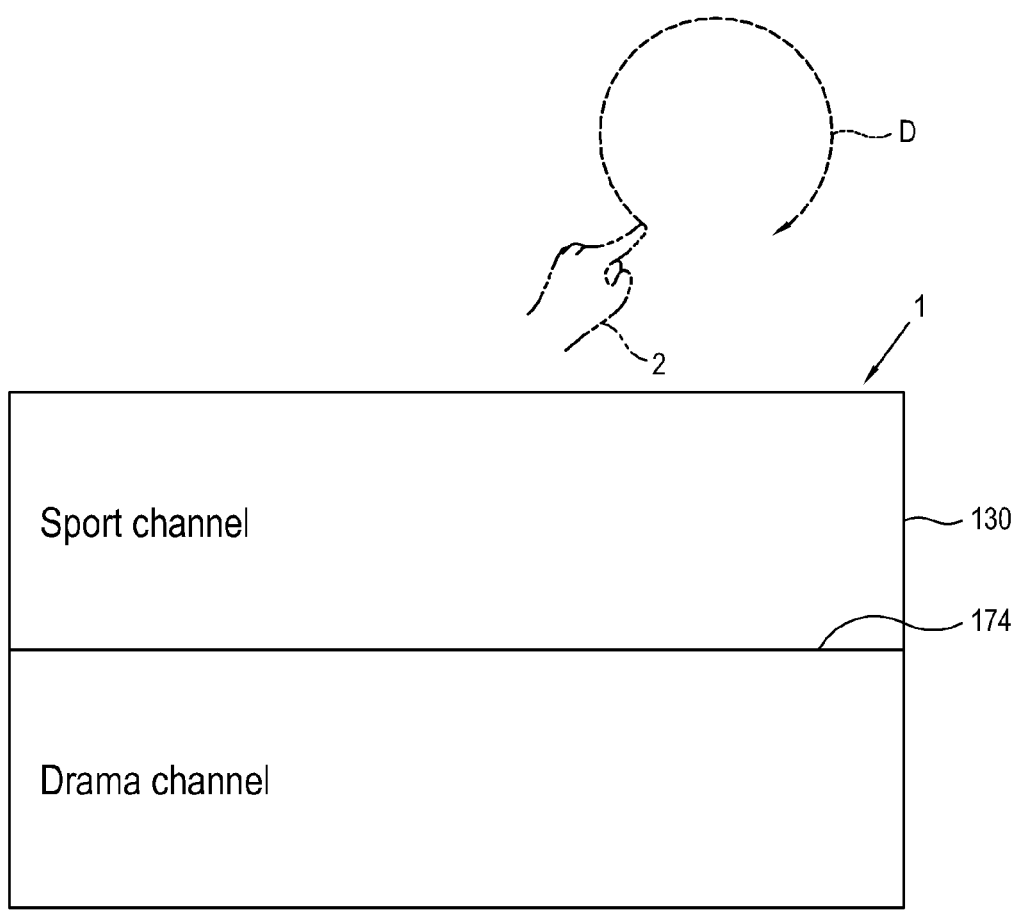

FIG. 6 illustrates an example of operations of a display device 1 according to another exemplary embodiment.

A shape of a user input may be a circle, which may be set to execute and display a sport channel application 174 on the display 130. Additionally it is identified from which side, specifically one of a top/bottom/left/right sides, a user input, i.e., a gesture is input and received. Then the sport channel image may be displayed in a top portion of the display 130 corresponding to the user gesture that has been input from the top portion, and the image of a drama channel that was displayed prior to the user input may be now displayed in a bottom portion of the display 130. Depending on the input location of the user gesture, an image of the applications 172 to 179 may be displayed in the execution area as the corresponding location.

The execution area of the applications 172 to 179 may be determined in advance depending on a shape of a particular user input. For example, if the user 2 determines that the applications 172 to 179 for E-mail does not need to be displayed in a large size, he/she may control to display the applications 172 to 179 for E-mail in the execution area in a right bottom portion of the display 130 regardless of the location of a user input after receiving the user input for executing the applications 172 to 179 for E-mail.

Figure 7:
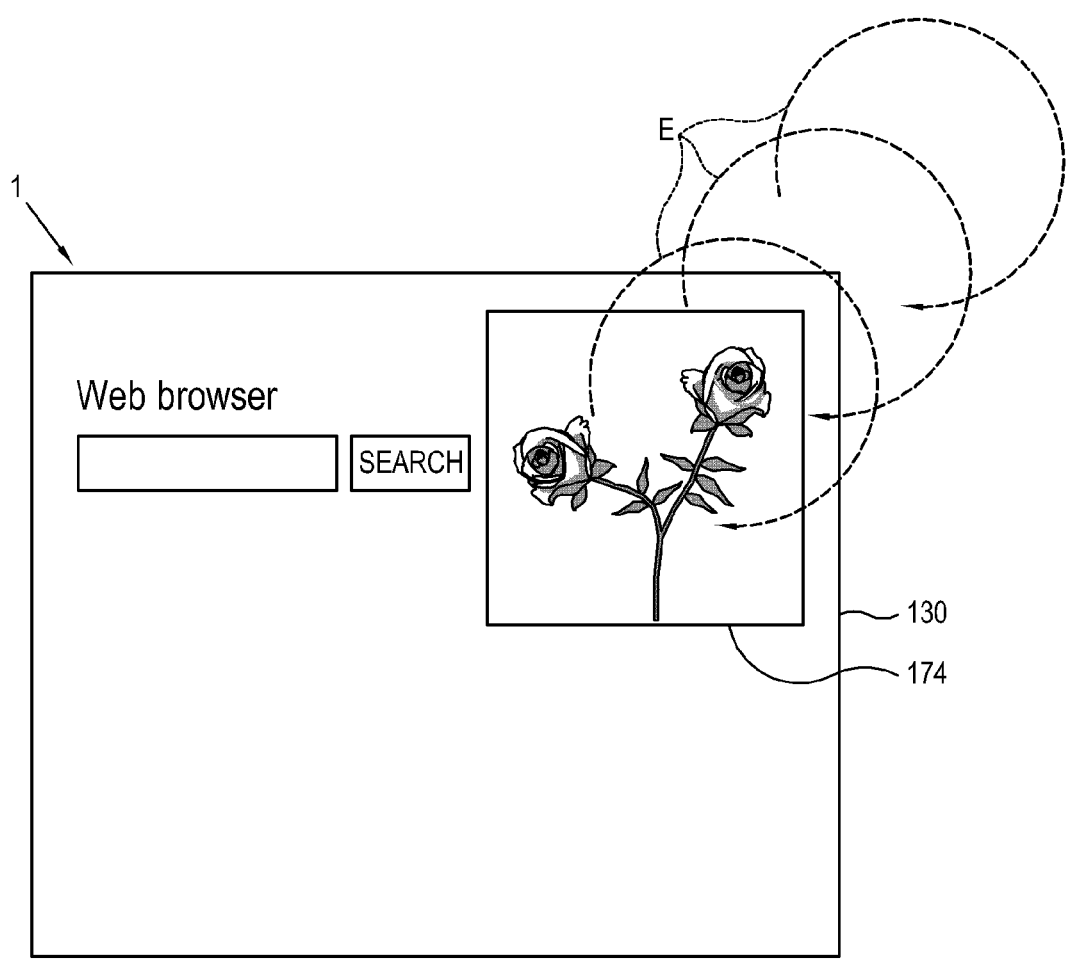

FIG. 7 illustrates an example of operations of a display device 1 according to another exemplary embodiment.

In FIG. 7, a user input is input from a right top portion of the display 130 while an image of the applications 172 to 179 for web browser is displayed. A user input E shows three types of the same gesture. A user input (i) is input within a screen area of the display 130, (ii) starts within the screen area of the display 130, goes outside the screen area of the display 130 and then ends within the screen area of the display 130, and (iii) is input outside the screen area of the display 130. Directions and starting and ending locations of the user input are identified, and the corresponding application 174 and the execution area of the application 174 are determined and displayed. As shown therein, the image of the application 174 may be displayed in a right top portion of the display 130 to which the starting and ending locations of the user input belong. If the starting location of the user input is a right top portion and the ending location is a right bottom portion of the display 130, the image of the application 174 may be displayed in a middle portion of the right side.

Figure 8:
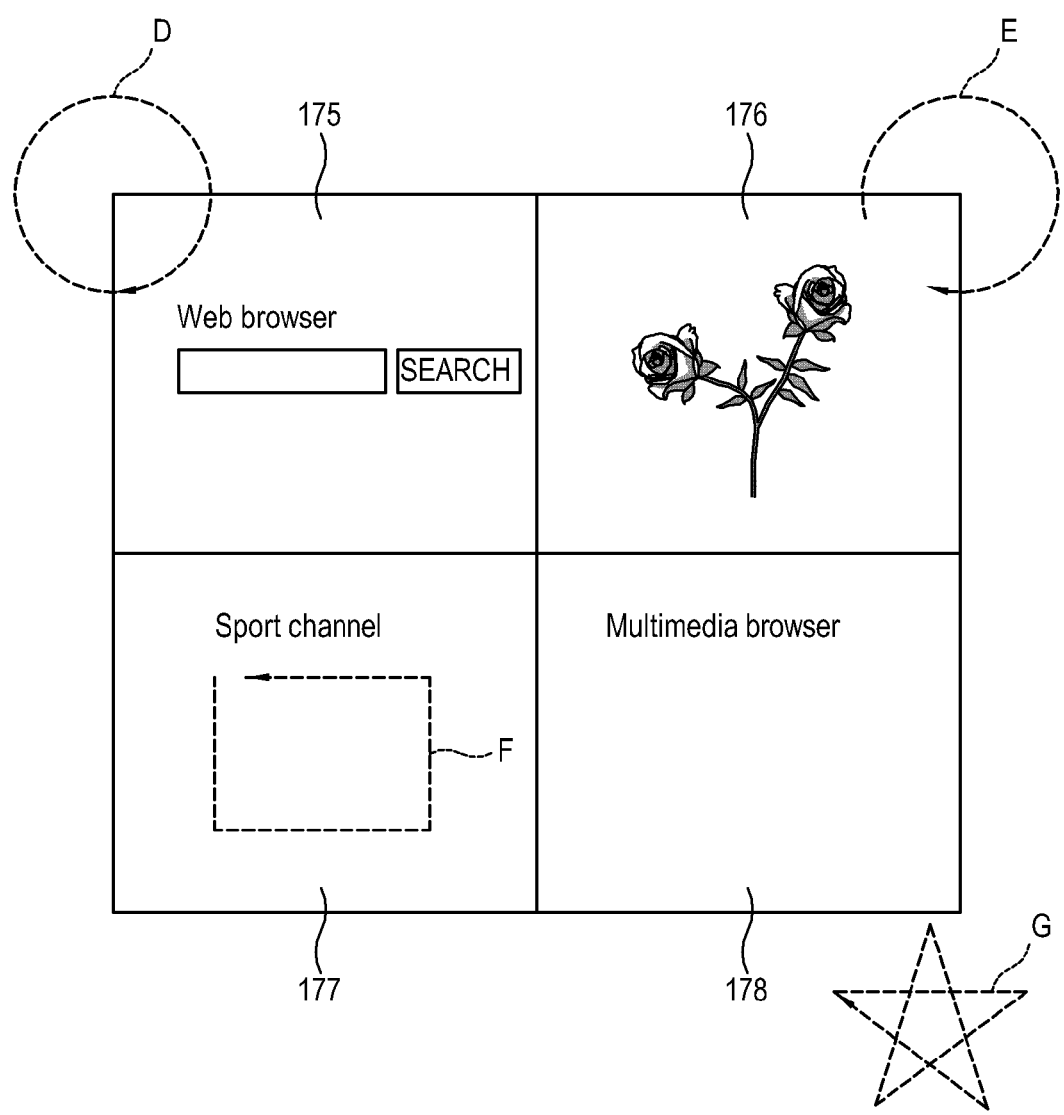

FIG. 8 illustrates an example of operations of a display device 1 according to another exemplary embodiment.

FIG. 8 illustrates the applications 175 to 178 that are executed, determined in terms of execution area, and displayed depending on the shape and input location of a user input.

As shown in FIG. 8, a user input D draws a complete circle and is input from a left top portion of the display 130 and thus the web browser 175 is displayed in the left top portion of the display 130. A user input E starts within a screen area of the display 130, goes outside the screen area and then ends within the screen area of the display 130, and such starting and ending locations of the user input E are determined and a flower image 176 is displayed in a right top portion of the display 130. A user input F is a square gesture that is input from a left bottom portion in a screen area of the display 130 and a sport channel image 177 is displayed in the left top portion of the display 130. A user input G is input form a right bottom portion outside the screen area of the display 130, and a multimedia browser image 178 is displayed in the right bottom portion of the display 130 corresponding to the shape, input location and direction of the user input G.

In this embodiment certain shapes correspond to certain programs. However the specific shape may be changed according to user preferences or set to some other shapes as the particular shapes and programs are exemplary embodiments. For example in this embodiment a complete circle corresponds to a web browser. In an alternative embodiment a square or a user defined shape may be set to correspond to a web browser. Similarly, in this embodiment a square corresponds to a sport channel. However, in an alternative embodiment the sport channel may correspond to an oval shape, a football shape, or another shape defined by a user.

Further, according to another exemplary embodiment, the user may enter the shape in the center of the screen then provide a location gesture or voice command indicating the desired location for the application that corresponds to the shape made by the user.

Figure 9:
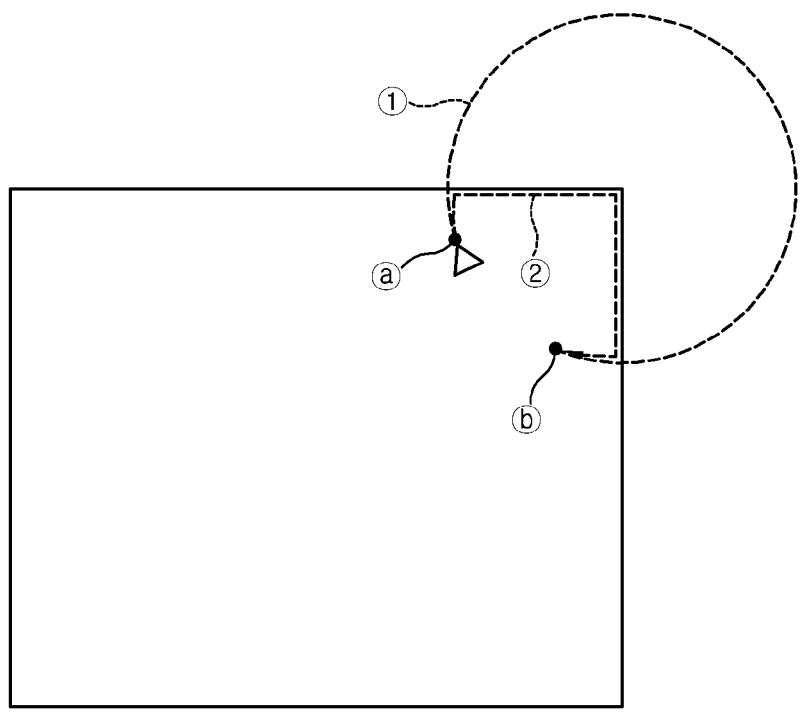
Figure 9:
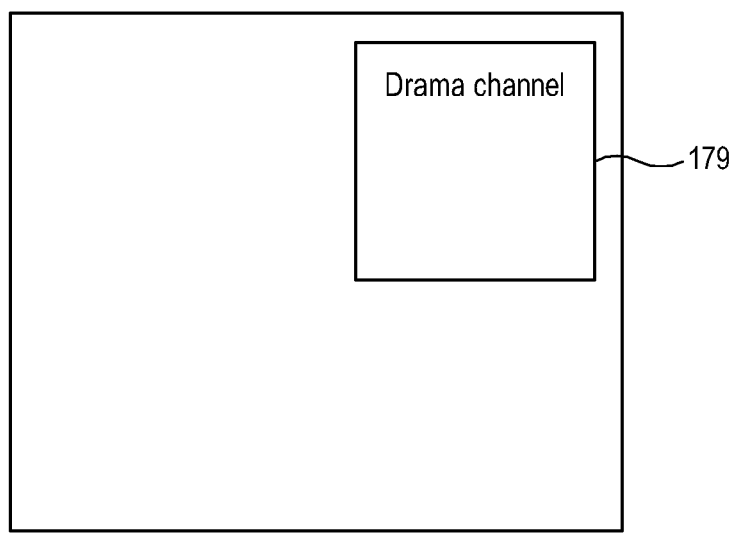

FIG. 9 illustrates an example of operations of a display device 1 according to another exemplary embodiment.

As shown therein, as a pointer operates corresponding to a user input, the user input moves to the outside of a screen area of the display 130 from the screen area thereof and then comes back to, and ends in, the screen area. A pointer operation ② corresponding to the user input ① moves from ⓐ as a starting location to the right side along the end of a right top portion of the display 130, and then moves downward along the end of the right top portion, and then moves to ⓑ as an ending location corresponding to the user input. In such case, a user input is received from outside the screen area of the display 130, and the pointer moves around.

Corresponding to the shape, starting location, ending location and direction of the user input, the drama channel image 179 is displayed in a right top portion of the display 130.

As described above, the display device 1 according to the exemplary embodiments may execute the selected applications 172 to 179 in a selected location and in a selected size through a particular user input and enable a user to conveniently use the applications 172 to 179 even while viewing images.

A display device, a calibration device and a control method thereof according to exemplary embodiments may execute selected applications in a selected location through a particular user input and enable a user to conveniently use the applications while viewing images.

Although a few exemplary embodiments have been shown and described, it will be appreciated by those skilled in the art that changes may be made in these exemplary embodiments without departing from the principles and spirit of the invention, the range of which is defined in the appended claims and their equivalents.

What is claimed is:

1. A display device comprising:
a memory configured to store a plurality of applications;
a user interface (UI) configured to receive a user input;
a display; and
a processor configured:
to control the display to display a first screen;
in response to a gesture user input being received via the UI while the first screen is displayed, to determine:
a shape of the received gesture user input matches a stored shape corresponding to an application stored in the memory,
the application from among the plurality of applications, stored in the memory, corresponding to the shape of the received gesture user input, and
a display area in the display for the determined application based on a location of the gesture user input with respect to the display; and
to control the display to display an execution image of the determined application in the determined display area while at least a part of the first screen remains displayed, wherein the gesture user input comprises a first input and a second input that is continuous with the first input, and at least one of the first input and the second input comprises an input of passing a boundary between an area inside and an area outside a screen area of the display.

2. The display device of claim 1, wherein the gesture user input comprises an input by at least one of a pointing device and a gesture.

3. The display device of claim 1, wherein the processor is further configured to control the UI, and
wherein the UI is further configured to receive a touch input on the first screen from a user using a pointer.

4. The display device of claim 1, wherein the memory is further configured to store the application and the display area of the application in association with the shape.

5. The display device of claim 1, wherein the processor is further configured to control the display to display a UI of the application in a size on the display based on the shape of the received gesture user input.

6. The display device of claim 1, wherein the processor is further configured to identify a starting location and an ending location of the gesture user input, and the display area of the application is based on the starting location and the ending location.

7. The display device of claim 1, wherein the processor is further configured to determine the display area of the application according to a direction of the gesture user input.

8. A method for controlling a display device, the method comprising:
displaying a first screen on a display;
receiving a gesture user input via a user interface (UI) while the first screen is displayed;
in response to the gesture user input being received, determining:
a shape of the received gesture user input matches a stored shape corresponding to a stored application,
the application from among a plurality of stored applications, corresponding to the shape of the received gesture user input, and
a display area in the display for the determined application based on a location of the gesture user input with respect to the display; and
displaying an execution image of the determined application in the determined display area while at least a part of the first screen remains displayed, wherein the gesture user input comprises a first input and a second input that is continuous with the first input, and at least one of the first input and the second input comprises an input of passing a boundary between an area inside and an area outside a screen area of the display.

9. The method of claim 8, wherein the gesture user input comprises an input by at least one of a pointing device and a gesture.

10. The method of claim 8, wherein the receiving further comprises:
receiving a touch input on the first screen from a user using a pointer.

11. The method of claim 8, wherein the determining the application comprises: determining whether the shape of the received gesture user input matches a stored shape corresponding to the application.

12. The method of claim 8, wherein the displaying comprises: generating a UI of the application in a size based on the shape of the received user input.

13. The method of claim 8, wherein the determining the display area comprises:
   identifying a starting location and an ending location of the gesture user input; and
   determining the display area of the application based on the starting location and the ending location.

14. The method of claim 8, wherein the determining the display area comprises: determining the display area of the application according to a direction of the gesture user input.

15. A display device comprising:
   a memory configured to store a plurality of applications;
   a display;
   a user interface (UI) configured to receive a user input;
   a processor configured:
      to control the display to display a first screen;
      in response to a gesture user input being received via the UI while the first screen is displayed: to determine a shape of the received gesture user input matches a stored shape corresponding to an application stored in the memory, and to select:
      the application from among the plurality of applications, stored in the memory, based on the shape of the received gesture user input, and a display area on the display, based on a location of the gesture user input relative to the display, in which an execution image of the selected application is to be displayed while at least a part of the first screen remains displayed, wherein the gesture user input comprises a first input and a second input that is continuous with the first input, and at least one of the first input and the second input comprises an input of passing a boundary between an area inside and an area outside a screen area of the display.

16. The display device of claim 15, wherein the processor is further configured to determine another display area of the display on which to display a second application on a second display area.

* * * * *